Aug. 5, 1969          A. T. BUTTRISS          3,459,396
FASTENER DEVICE AND MOUNTING ASSEMBLY
Original Filed Feb. 28, 1966
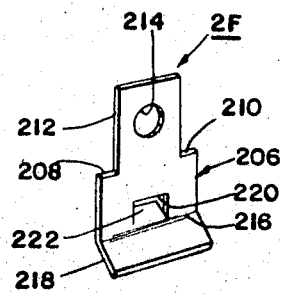
FIG. I
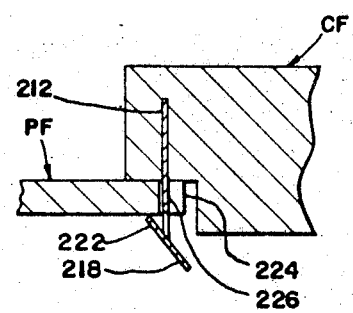
FIG. 2
INVENTOR.
ALBERT T. BUTTRISS
BY
ATTORNEYS

United States Patent Office 3,459,396
Patented Aug. 5, 1969

3,459,396
FASTENER DEVICE AND MOUNTING ASSEMBLY
Albert T. Buttriss, Westlake, Ohio, assignor to Tinnerman Products, Inc., a corporation of Ohio
Original application Feb. 28, 1966, Ser. No. 530,722, now Patent No. 3,368,780, dated Feb. 13, 1968. Divided and this application Oct. 24, 1967, Ser. No. 677,528
Int. Cl. H02g 3/00
U.S. Cl. 248—27      5 Claims

ABSTRACT OF THE DISCLOSURE

A fastening device including a generally flat body with one end adapted to be embedded within the material of an article and the other end having a resilient tongue adapted for locking engagement with a support member for mounting the article in assembled relation through an opening in the support member.

BACKGROUND OF THE INVENTION

This invention relates in general to fastening means and more particularly to fastener devices and an assembly for retaining objects, such as electrical connectors, in mounted relation on a workpiece. This application is a division of application Ser. No. 530,722, filed Feb. 28, 1966, to Albert T. Buttriss, now Patent No. 3,368,780, which latter application is a division of application Ser. No. 393,170, filed Apr. 31, 1964, now Patent 3,279,729.

Conventionally, various types of electrical connectors have been mounted on panels, modules or circuit board racks, such as applied in electronic installations, for connection to a source of electrical power. Heretofore, various fastening devices and/or assemblies, such as screw or rivet arrangements, have been proposed for mounting such connectors on the panels. In this respect, it has been found that these heretofore known devices are not satisfactory due to their expense of manufacture and the difficulty incident to their assembly and disassembly, particularly in relation to the installation of a great number of connectors in blind locations which are not readily accessible at the rear of the panel to complete the installation. It has further been found that these heretofore known devices do not afford an exact alignment between the parts, particularly when there exists substantial tolerance variation between the parts; nor do they prevent lateral shifting movement of the connectors, particularly where adjacent of the connectors are either missing or removed from installed position on the panel.

Accordingly, an object of the present invention is to provide a simple, yet sufficient fastener device construction which is inexpensive to produce for mounting an electrical element, such as a connector to a workpiece.

Another object of the present invention is to provide a sheet metal fastener device of the character described which can be readily and easily assembled and disassembled for mounting an electrical connector on a supporting member, such as a panel, modules, circuit rack or the like, thereby dispensing with the necessity of heretofore known screw and rivet arrangements.

A further object of the present invention is to provide an improved assembly including an electrical connector to be mounted on a workpiece, such as a panel, modules, circuit rack or the like, and a fastener device for retaining the connector in mounted position on the workpiece and in a manner to prevent lateral shifting movement of the connector irrespective of tolerance variations between the parts.

Further objects and advantages of the present invention will be apparent to those skilled in the art as the present invention will be apparent to those skilled in the description herein proceeds in reference to the accompanying drawings in which like reference characters designated like parts throughout and in which:

SUMMARY OF THE INVENTION

The present invention contemplates providing a fastener device for mounting an electrical connector on a supporting member, such as a panel or the like, which comprises a generally flat body having one end adapted for embedment within the material of the electrical connector to provide a unitary structure. The opposite end of the body is provided with a resilient flange portion and a resilient tongue portion which are bent from the body and which are adapted for engagement with the confronting surface of the support member to prevent movement of the connector when in the assembled position. In addition, the connector is provided with a reduced portion having an aperture extending therethrough for facilitating embedment of the fastener device in the connector. Furthermore, the resilient tongue and flange portions are disposed so as to be generally co-planar with respect to one another with each extending from opposite sides of the fastener body.

By the foregoing arrangement, there is provided a fastener device which is inexpensive to produce, and which can be readily and easily assembled and disasssembled for mounting an electrical connector to a supporting member, such as a panel, module, circuit rack or the like, thereby dispensing with the necessity of heretofore known screw and rivet arrangements. In addition, there is provided an improved assembly including an electrical connector to be mounted on a panel or the like, and whereby the fastener device retains the connector in the mounted position to prevent lateral shifting movement of the connector irrespective of the tolerance variations between the respective parts.

BRIEF DESCRIPTION OF THE DRAWINGS

FIG. 1 is an enlarged generally perspective view of the fastener device made in accordance with the present invention; and FIG. 2 is a fragmentary cross-sectional view showing one end of an article, such as an electrical connector, mounted in an opening in a support member by one of the fastener devices of FIG. 1.

Referring now again to the drawings and in particular to FIGS. 1 and 2 thereof, there is shown one embodiment of the fastener device, designated generally at 2F, for mounting an electrical connector CF on an aperture support panel PF, such as might be utilized in an electronic installation. The fastener 2F is of a relatively simple, inexpensive construction susceptible for economical quantity production from standard sheet metal strip with minimal waste of material. The fastening 2F may be made from any suitable sheet material preferably that of a spring-like nature, such as spring steel or cold rolled steel having spring-like characteristics.

As illustrated in FIG. 2, the connector CF includes a body made preferably from an electrical insulating material, such as a ceramic or polymeric material or other such material having electrical insulating characteristics. The body in the embodiment shown is provided with a pair of flanged ends (only one shown) extending laterally outwardly from opposite ends of the body and which are adapted to overlie the marginal portions of an opening 224 provided in the panel PF. The connector CF may be provided with suitable male electrical connection elements (not shown) for connection to a source of power (not shown). Moreover, by use of a pair of the fastener devices 2F constructed in accordance with the present invention, any number, size, and/or shape of connector may be readily applied to any size, and/or shape of apertured support panel dependent upon the desired application, such as may be utilized in an electronic installation.

In FIGS. 1 and 2 there is illustrated the fastener device, designated generally at 2F, which is particularly useful in mounting an electrical connector CF to a support panel PF, but wherein the fastener has been provided as a composit, unitary part of the connector. In this form, the strip is provided so as to define a generally flat or planar base 206 which is struck-out adjacent one end and on either side thereof, as at 208 and 210, to provide a portion 212 of reduced transverse dimension relative to the transverse dimension of the main body of the base. Such reduced portion is adapted to be fixedly embedded in the material of the connector (FIG. 2). This reduced portion 212 is preferably provided adjacent its free end with an aperture 214 so that when such portion is embedded in the material of the connector there is achieved a positive anchoring construction to prevent any movement of the fastener relative to the connector.

The other end of the base 206 is bent along the bend line 216 to provide a flange 218 which extends downwardly and angularly outwardly from the general plane of the base 206. The base 206 is struck-out immediately adjacent the bend line 216, as at 220, to provide a resilient tongue 222 which projects outwardly and angularly upwardly from the opposite side of the base and in the same general plane as the flange 218 for engagement with the bottom or undersurface of the panel adjacent the panel opening 224. Here again, the panel may be notched-out, as at 226, immediately adjacent the opening 224 to snugly receive therein the base 206 of the fastener, as shown in FIG. 2.

Hence, in application of this form of the invention, a pair of the fastening devices 2F may be readily pre-assembled with the connector CF simply by embedding the reduced portions 212 theerof in the material of the flanged ends 36 of the connector, such as by conventional molding techniques, thereby to provide a composite, unitary structure. Thus assembled, the connector CF may then be inserted into the opening 224 in the panel PF so that the fasteners are disposed through the notched portions 226 immediately adjacent the panel opening 224. In this assembled position, the resilient tongues 222 are disposed in locking engagement against the confronting bottom or undersurface of the panel immediately adjacent the panel opening 224, thereby to effectively prevent any movement of the fastener relative to the panel, and hence, to prevent any movement of the connector relative to the panel in the final assembled position thereof.

From the foregoing description and accompanying drawings of the embodiments of the fastener device made in accordance with the present invention, it can be seen that an article or object, such as an electrical connector, can readily and easily be applied to a support member, such as a panel, and in a manner to effectively prevent any movement of the connector relative to the panel in the assembled position. It can be seen further that such assembly can be accomplished regardless of any tolerance variations between the parts and regardless of any size, shape or thickness variations of connector and/or panel. Hence, though the fastener device and assembly illustrated herein have been illustrated in connection with the mounting of an electrical element, such as a connector, to a supporting panel, it is to be understood that the fastener device and assembly contemplated herein can also be satisfactorily utilized for mounting other articles or objects, such as moldings, trim strips, inspection plates, covers and the like, to other types of supporting members, such as chassis, frames, or other similar such type of supporting panel.

Thus while we have illustrated herein a preferred embodiment of our invention, it is to be understood that changes and variations may be made by those skilled in the art without departing from the spirit and scope of the appended claims.

I claim:

1. A fastening device in combination with a pair of elements being joined together by said fastening device, said device comprising a generally flat body, one end of said body embedded within the material of one of said elements to provide a composite, unitary structure, the other end of said body passing through an aperture in the other of said elements and having a resilient flange portion bent from said body extending downwardly and inwardly of said one elements and having a resilient tongue portion extending upwardly and outwardly engaging a confronting surface of said other element to prevent movement of said one element in the assembled position of said device, the embedded end of said body including an aperture extending therethrough receiving the material of said one element therein interlocking said device with said one element, and said resilient tongue and said flange portions being generally co-planar with respect to one another and with each extending from opposite side of said body.

2. A fastening device in accordance with claim 1, wherein the end of said body embedded within the material of said one element includes a portion of reduced transverse width as compared to the remaining width of said body, and said and tongue portion is of lesser widthwise dimension as compared to said reduced portion.

3. A fastening device in accordance with claim 1, wherein said tongue and said flange portions are angularly disposed with respect to said body with said tongue portion being disposed at an acute angle, and said flange portion being disposed at an obtuse angle with respect to the body of said device.

4. A fastening device in accordance with claim 1, wherein said resilient tongue portion is generally centrally disposed with respect to the body of said device.

5. A fastening device in combination with a pair of elements being joined together by said fastening device, said device comprising a generally flat body, one end of said body embedded within the material of one of said elements to provide a composite, unitary structure, the other end of said body having a resilient flange portion bent from said body extending downwardly and inwardly of said one element and having a resilient tongue portion extending upwardly and outwardly engaging with a confronting surface of said other element to prevent movement of said one element in the assembled position of said device, the embedded end of said body including a portion of reduced transverse width as compared to the remaining width of said body, said reduced portion including an aperture extending therethrough receiving the material of said one element therein to interlock said device with said one element, said tongue and said flange portions being generally co-planar with respect to one another with each extending from opposite sides of said body, said tongue portion being of lesser lengthwise dimension as compared to said flange portion and said tongue portion being of lesser widthwise dimension as compared to said reduced portion, said resilient tongue being at an acute angle with respect to said body, and said flange portion being disposed at an obtuse angle with respect to said body.

References Cited

UNITED STATES PATENTS

| | | | |
|---|---|---|---|
| 2,174,145 | 9/1939 | Tummins | 85—11 |
| 2,241,657 | 5/1941 | Dehring | 248—247 |
| 2,584,813 | 2/1952 | Poupitch | 85—5 |
| 2,703,604 | 3/1955 | Becker. | |
| 3,276,800 | 10/1966 | Loudon et al. | 287—189.35 |

CARL W. TOMLIN, Primary Examiner

R. S. BRITTS, Assistant Examiner

U.S. Cl. X.R.

24—73; 85—11; 248—248; 287—189; 339—126